Feb. 9, 1965    L. S. TENNICAN    3,168,850
TOGGLE BOLT
Filed Aug. 26, 1960    2 Sheets-Sheet 1
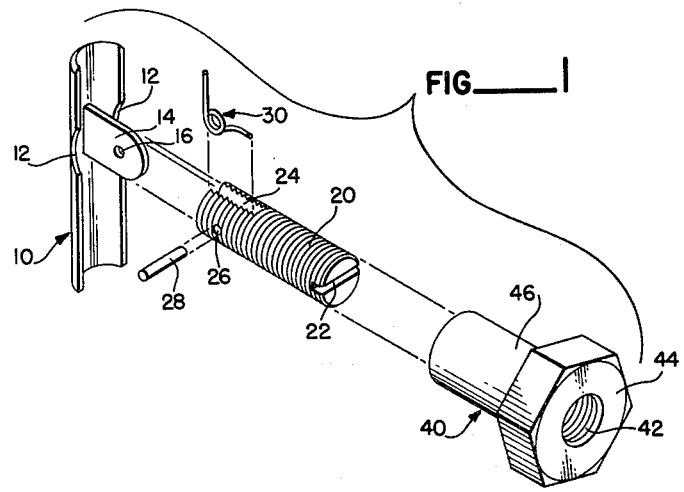
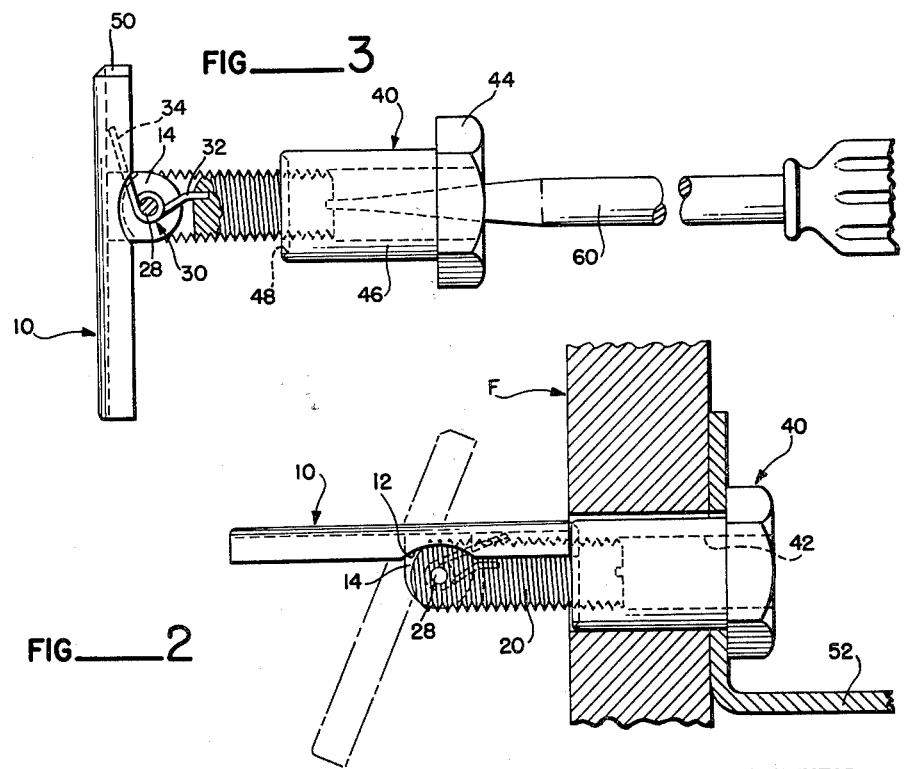
INVENTOR.
LEONARD S. TENNICAN
BY
Smith + Tuck

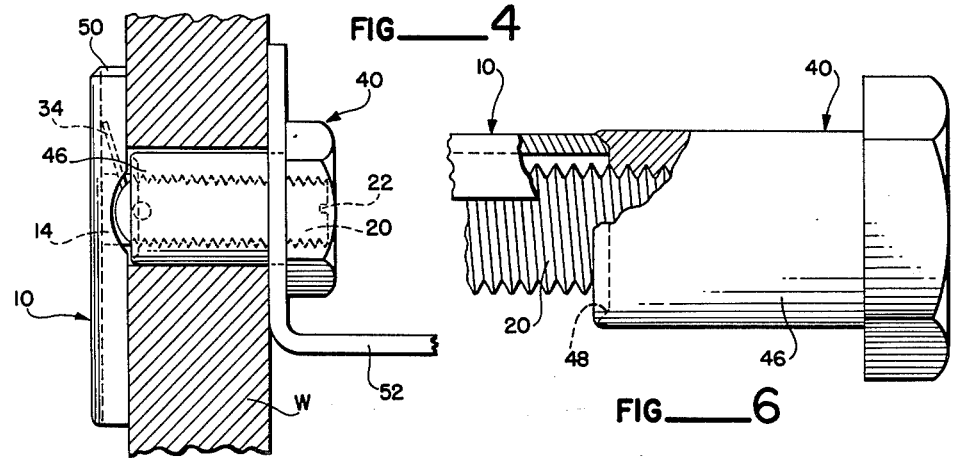
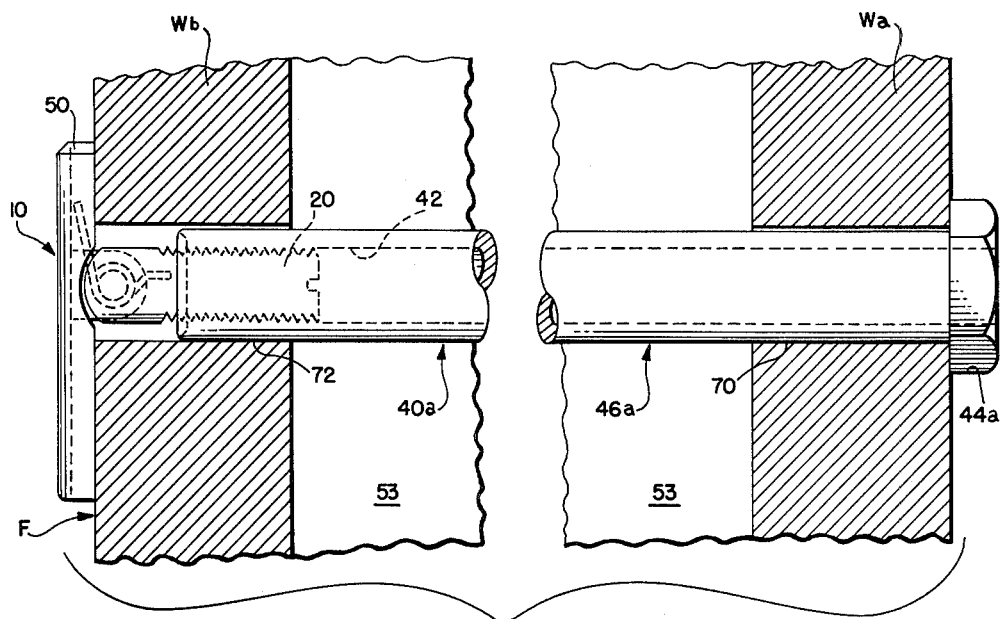

United States Patent Office 3,168,850
Patented Feb. 9, 1965

3,168,850
TOGGLE BOLT
Leonard S. Tennican, 6838 44th Place NE.,
Seattle 15, Wash.
Filed Aug. 26, 1960, Ser. No. 52,300
3 Claims. (Cl. 85—3)

This invention relates to the general field of toggle bolts and more particularly to a toggle bolt which is provided with positively acting means for holding the toggle member in alignment with the body of the bolt so that it can be easily passed through one or more spaced walls or the like. Means are further provided for releasing the toggle which is then spring urged into position and a positive screw locking means provided so that a secure fastening may be obtained.

Many toggle bolts have been provided in the past, each of which serve to form an anchorage after a toggle member or hook of some type has been passed through a wall member. However there are many forms of walls where it may be desirable to pass the locking member of a toggle bolt through a plurality of spaced apart wall members. This is especially true of constructions, using fibrous board or plaster board which of itself is not adequate to support any strain. It is possible to employ my present toggle bolt in a wide variety of positions which to my knowledge is not possible with equipment presently available on the market. There are many walls in which the inside finished wall is not adequately reinforced to accept a strain and any strain applied to the usual toggle bolt will only loosen the plaster or fibrous material of which the wall surface is made and eventually disfigure the wall and loosen the fastening. This present toggle bolt on the other hand may be selected of a length which will go into the wall until one of its strength members is encountered. This strength member may be expanded metal or lumber or plywood paneling which has sufficient strength to prevent enlarging and ultimately disfiguring the wall as well as loosening the bolt.

The principal object of this present invention therefore is to provide a toggle bolt in which the toggle member is pivoted in effect to a machine screw having a slotted outer end adapted to receive a screw drive, thus permitting exact angular positioning of the toggle bolt.

A further object of this present invention is to provide means whereby the toggle member may be locked in the prolongation of the toggle bolt proper so that when it is folded as for inserting in an opening and the toggle passes beyond the inner surface of the wall it is releasable through the use of a screw driver and wrench making it a positive operation.

A further object of this present invention is to provide means whereby a toggle bolt may be passed through a plurality of spaced apart walls each having an aligned opening the size of the initial hole in which the bolt is entered.

Further objects, advantages and capabilites will be apparent from the description and disclosure in the drawings, or may be comprehended or are inherent in the device.

FIGURE 1 is a bracketed view in perspective illustrating the various parts making up a preferred form of my invention.

FIGURE 2 illustrates the manner in which the toggle member of my bolt is held in alignment with the bolt proper until the toggle has passed through a wall element.

FIGURE 3 illustrates the manner in which the bolt may be angularly positioned when in use and shows a screw driver used for this purpose.

FIGURE 4 is a successive step after FIGURE 2 and illustrates the toggle bolt structure in its final position holding a bracket member to which a force may be applied.

FIGURE 5 is a bracketed view showing the manner in which an elongated form of my bolt may be used in passing through spaced apart wall elements.

FIGURE 6 is an enlarged fragmentary view illustrating the locking means for holding the toggle parallel to the bolt during the bolt's insertion in an opening.

Referring to the drawings, throughout which like reference characters indicate like parts, the numeral 10 designates a toggle member, in a preferred form, for use with my bolt. The toggle is cut away at 12 on each side of the semi-tubular form of toggle member to accommodate the end of the screw with which it is used. Further, a lug 14 is provided having the pin engaging opening 16. Adapted to engage toggle member 10 is the slotted screw 20. This member is threaded throughout its length and is provided at one end with a screw driver kerf 22 and at the other or inner end with a slot 24 adapted to receive lug 14 of the toggle member 10. The slotted end of screw 20 is drilled at 26 to provide for the pivot pin 28. Slot 24 in addition to providing space to accommodate lug 14 also accommodates one leg of the toggle operating spring 30. Screw 20 is drilled to accept the bent end 32 of torsion spring 30 and the opposite leg of spring 34 is disposed at an angle permitting it to fold for the insertion of the toggle bolt as is illustrated in FIGURE 2. When the toggle is released the spring will swing the toggle to the position at right angles to the longitudinal axis of bolt 20 after the showing of FIGURES 3, 4 and 5.

Adapted to encircle screw 20 is the skirted or tubular nut 40. This nut is interiorly threaded at 42 through the nut portion 44. The sleeve portion 46 is threaded with the same sized thread in continuation with the nut portion. Additionally the end of sleeve 46, remote from the nut end 44, is angularly faced interiorly to provide a beveled annular seat 48 in which a similar but oppositely shaped end 50 of toggle 10 is adapted to be seated during the entry of the bolt into a hole during use. This arrangement is illustrated in FIGURE 2. Toggle bolts are used in various way to support a strain or load and in the drawings in FIGURES 2 and 4 I have illustrated the bolt as securing an angle bracket 52 in place.

In FIGURES 1 through 4 I have illustrated a form of toggle bolt that has very general application. In FIGURE 5, however, I have illustrated, by extending the length of the tubular nut somewhat. One of the outstanding advantages of my toggle bolt is that it may be used as a conventional bolt through a single wall W but finds special application where the wall members as Wa and Wb are spaced apart or where one of the walls as Wa may not be made of sufficiently dense material to take the strain of the toggle when the same is tightened or a load applied as to bracket 52. In FIGURE 5 it is indicated that wall member Wb is a member of normal strength as the exterior sheathing on the outside of the studding 53, for instance.

*Method of application*

In using this type of toggle bolt the same is assembled after the showing of FIGURE 2 in which it will be noted that screw 20 is extended out of sleeve nut 40 with toggle 10 disposed parallel to screw 20 and with the beveled end 50 of the toggle seated in the annular, beveled seat 48 and held in position by revolving nut 40 with respect to screw 20 until a firm engagement is obtained. As will be observed in this view it is very desirable to have the toggle made with a semi-cylindrical cross section. The bolt in this, locked in alignment position, is entered in the opening in the wall and passed in sufficiently so that the beveled end of the toggle is beyond the inner face F of the wall. A screw driver 60 is entered into the screw kerf 22 of screw 20 while a wrench is preferably applied to the nut portion 44 of a sleeve nut 40. With this arrangement the screw may be turned with respect to the nut or the screw may be preferably held by the screw driver against turning while the nut 40 is turned with the wrench until the beveled end 50 is withdrawn from the angular seat 48 of the sleeve nut. At this time spring 30 is released and revolves the toggle from a position at FIGURE 2 to the position of FIGURE 3. The angular position of the toggle member may now be adjusted by the screw driver. The axis of the pivot pin 28 or the longitudinal axis of toggle 10 should bear a definite angular relationship to kerf 22. The next step is to turn one of the members 20 or 40 with respect to the other until the position illustrated in FIGURE 4 is obtained. It will be believed apparent that either member might be held as by the screw driver or the wrench while the other one is turned.

Referring to FIGURE 5 it will be apparent that if openings 70 and 72, in the spaced apart wall elements Wa and Wb are in alignment as they would be if bored by the same bit or auger, hole 70 will in effect be a guide for the extended sleeve portion 46a and the bolt will be easily entered and passed through hole 72 in a wall member Wb. As before as soon as the beveled end of a toggle member is beyond the surface on which it is to bear it can then be replaced by the same method as is previously described and with the toggle in the position transversely of the bolt, the bolt can be tightened providing secure means to either hold the two wall elements together as for instance in a concrete form, or it may be employed to support a bracket similar to bracket 52, but using the inner wall member Wb as the member that can accept the strain which the bolt will impose in such a situation if wall member Wa is soft or has an easily damaged surfacing. Under certain conditions a suitable washer or bracket member might be required under the nut portion 44a.

It is believed that it will be clearly apparent from the above description and the disclosure in the drawings that the invention comprehends a novel construction of toggle bolt.

Having thus described my invention, I claim:
1. A toggle bolt assembly comprising:
   (1) a threaded bolt having a screw driver slot at its inner end;
   (2) a toggle member pivotally secured to the outer end of said threaded bolt capable of moving from a position substantially parallel to the axis of said bolt to a position substantially perpendicular to the axis of said bolt;
   (3) a tubular sleeve member interiorly threaded to threadedly receive said bolt; said sleeve member being interiorly and annularly hollowed at the bolt-receiving end thereof to receive one end of said toggle member when the same is moved to a position parallel to the axis of said bolt; and
   (4) means to bias said toggle member into a position substantially perpendicular to the axis of said bolt.
2. A toggle bolt assembly as recited in claim 1 in which said toggle member comprises a body of semitubular cross-section having a pierced outstanding lug radially secured in said body substantially at its longitudinal center, said body being externally beveled at one end thereof for reception by said hollowed portion of said sleeve member.
3. A toggle bolt assembly comprising:
   (1) a threaded bolt having a screw driver slot at its inner end;
   (2) a toggle member pivotally secured to the outer end of said threaded bolt capable of moving from a position substantially parallel to the axis of said bolt to a position substantially perpendicular to the axis of said bolt;
   (3) a tubular sleeve member interiorly threaded to threadedly receive said bolt; said sleeve member being interiorly and annularly hollowed at the bolt-receiving end thereof to receive one end of said toggle member when the same is moved to a position parallel to the axis of said bolt, said sleeve member being longer than said threaded bolt; and
   (4) means to bias said toggle member into a position substantially perpendicular to the axis of said bolt.

References Cited in the file of this patent
UNITED STATES PATENTS

| | | |
|---|---|---|
| 198,937 | Gott | Jan. 8, 1878 |
| 1,112,622 | Jones | Oct. 6, 1914 |
| 1,153,797 | Kegreisz | Sept. 14, 1915 |
| 2,024,871 | Parsons | Dec. 17, 1935 |
| 2,502,858 | Klix | Apr. 4, 1950 |
| 2,572,022 | Francis | Oct. 23, 1951 |
| 2,840,398 | Chapellier | June 24, 1958 |
| 3,001,252 | Erickson | Sept. 26, 1961 |